TRANSISTORIZED LOW NOISE PREAMPLIFIER HAVING HIGH RESISTIVE INPUT IMPEDANCE AND LOW INPUT CAPACITY
Filed Aug. 12, 1964
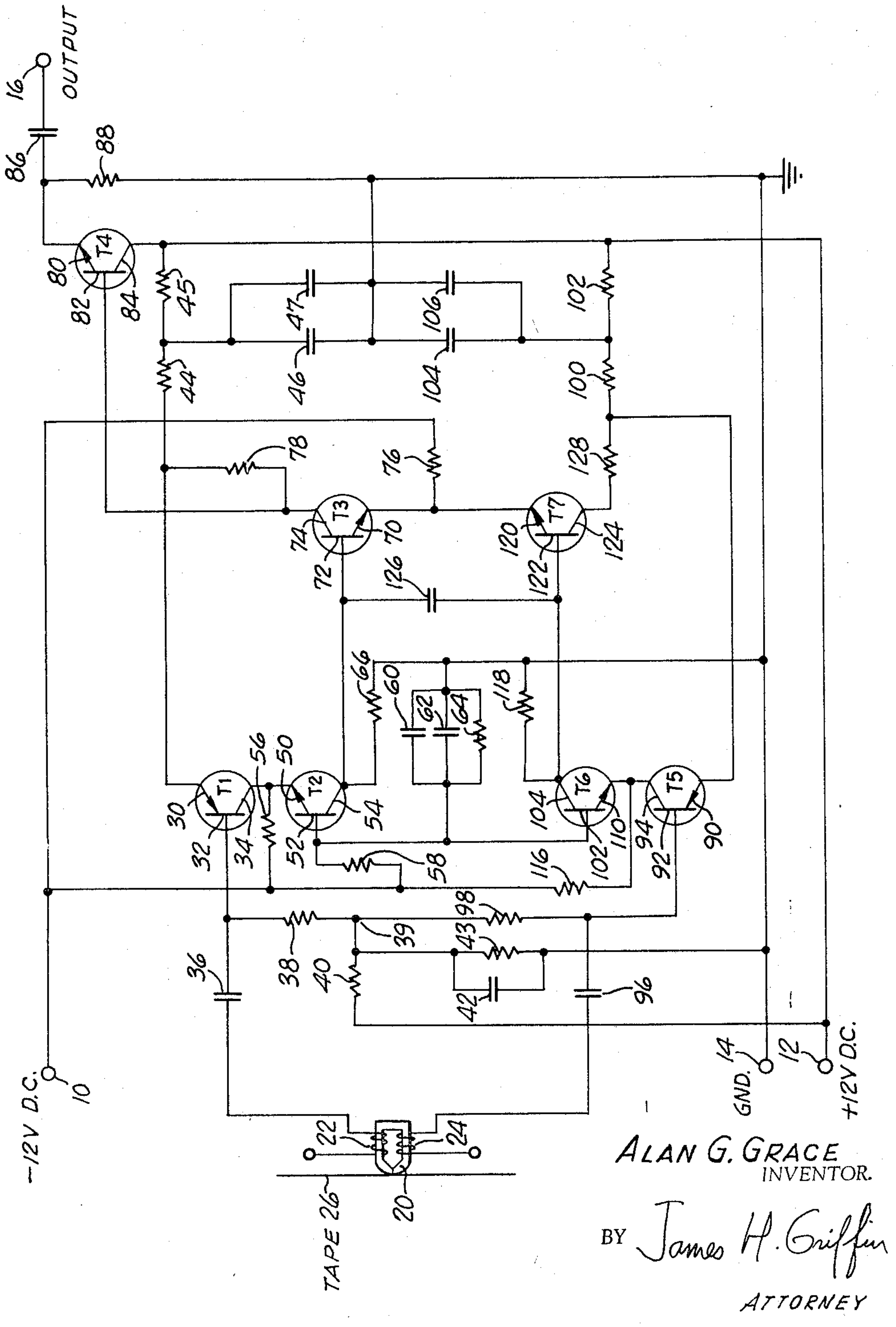
ALAN G. GRACE
INVENTOR.
BY James H. Griffin
ATTORNEY

United States Patent Office 3,296,544
Patented Jan. 3, 1967

3,296,544

TRANSISTORIZED LOW NOISE PREAMPLIFIER HAVING HIGH RESISTIVE INPUT IMPEDANCE AND LOW INPUT CAPACITY

Alan G. Grace, Menlo Park, Calif., assignor to Ampex Corporation, Redwood City, Calif., a corporation of California Filed Aug. 12, 1964, Ser. No. 389,027
4 Claims. (Cl. 330—14)

This application relates to amplifiers and more particularly to preamplifiers for the use in playback circuitry of magnetic tape recorders and the like.

The invention will be described in connection with a transistorized preamplifier for use in the input circuit of a magnetic tape recorder, but it is to be understood that the principle of applicant's amplifier may be applied to amplification circuits of all types and, indeed, to other circuits where low noise, voltage, and current stability are important considerations. Since the voltage developed across ceramic transducers, crystal microphones, or magnetic tape recorder playback coils is so low in amplitude as to be insufficient to drive the first stage of the main amplification system, it is customary to apply such signals to a preamplifier, which increases them to about 1 volt so they can emerge from the main amplification system at the proper voltage level. A preamplifier is designed also to reduce noise and hum and to provide a high input impedance for its associated transducer to "look into."

The transistor being of low input impedance when used in amplification circuits, the transistorized preamplifier must have a resistor, choke, emitter-follower transistor, or some more complicated arrangement in its input circuit to avoid overloading the signal source. Each of these elements has disadvantages: a series resistor, for example, attenuates the input signal, thus reducing the total amplification achievable, and increases also the noise factor of the system. A choke limits the frequency response of the system and, of course, is relatively bulky. Likewise, the emitter-follower transistor, often used, imposes an upper limit on the input impedance achievable, not to mention the attendant complications arising from bias circuitry, stability, and selection of a transformer.

In using transistors in amplifiers or other circuits, the best performance as far as minimizing noise is concerned requires that both current and voltage be maintained at certain levels throughout operation and that these operating levels be not only established initially, but also maintained throughout with good temperature and frequency stability. Moreover, various noise making elements should be thoroughly decoupled to ground.

It is, therefore, a general object of this invention to provide an improved preamplifier.

Another object of this invention is to provide a preamplifier having a high input impedance and low input capacitance.

Another object of this invention is to provide a preamplifier which achieves significant reduction in noise contribution.

Another object of this invention is to provide a preamplifier which allows greater freedom in head parameter than has heretofore been achieved.

Another object of this invention is to provide a preamplifier which permits use of a magnetic head with more turns than was heretofore possible, thereby making the head noise far more significant than the preamplifier noise so that the noise figure of the transducing system is minimal.

In the achievement of the above objects and as a feature of applicant's invention, there is provided a preamplifier having a balanced differential input with high resistances coupled to the input electrodes of the first amplification element. Low input capacitance of the amplification elements is achieved by the use of feedback to one input element thereof and by the use of very low voltage gain to reduce the "Miller effect," which has heretofore been a great limitation, while at the same time achieving sufficient power gain to minimize the effect of noise contributed by subsequent amplification stages. As another feature of applicant's invention, this low voltage gain and appreciable power gain is made possible by the use of grounded base transistors, or the like, for the second stage of amplification.

Other objects and features of this invention and a fuller understanding thereof may be had by referring to the following description and claims taken in conjunction with the accompanying drawing, in which there is shown a schematic of a preferred embodiment of applicant's invention.

Referring to the drawing, the circuit wherein the principles of applicant's invention are embodied has a negative power supply 10 and a positive power supply 12, a ground terminal 14, and an output terminal 16. For purposes of illustration, the positive power supply 12 and the negative power supply 10 are specified as +12 volts D.C. and −12 volts D.C., respectively. Input signals to this preamplifier circuit are supplied by a magnetic head 20, having windings 22 and 24, transducing signals from a moving magnetic tape 26.

A first transistor T1 having emitter 30, base 32, and collector 34 has its base 32 coupled through a D.C. blocking capacitor 36 to the winding 22 of the head 20. The base 32 is also coupled through a resistor 38 to a power supply junction 39, which is coupled to the positive power supply 12 through a resistor 40 and is decoupled to ground 14 through the parallel combination of a capacitor 42 and a resistor 43. The resistor 38 is of very high value, to provide a high input impedance to the head 20. The emitter 30 of the transistor T1 is coupled to the positive power supply 12 through two resistors 44 and 45. Parallel decoupling capacitors 46 and 47 are connected from a point between the resistors 44 and 45 and ground 14; similar parallel-capacitor decoupling is used at several points in applicant's circuit, to avoid the use of a single bulky capacitor while still decoupling over the entire noise spectrum.

A transistor T2 having emitter 50, base 52, and collector 54 is arranged in the grounded base configuration. Accordingly, the emitter 50 of the transistor T2 serves as an input electrode of the transistor and is directly coupled to the collector 34 of transistor T1. The emitter 50 is also coupled through a resistor 56 to the negative power supply 10, while the base 52 is coupled to the negative power supply 10 through a resistor 58 and to ground 14 through two decoupling capacitors 60 and 62 and a resistor 64, all three of which are arranged in parallel. The collector 54 of the transistor T2 is coupled through a resistor 66 to ground 14.

A transistor T3 having emitter 70, base 72, and collector 74 has its base 72 directly coupled to the collector 54 of the transistor T2. The emitter 70 is coupled to the negative power supply 10 through a resistor 76. A feedback loop from the collector 74 of the transistor T3 to the emitter 30 of the transistor T1 includes a resistor 78 coupled between these two electrodes.

The output of the circuit shown in the drawing is coupled through an emitter-follower transistor T4 having emitter 80, base 82, and collector 84. The base 82 is directly coupled to the collector 74 of the transistor T3, while the collector 84 is directly coupled to the positive power supply 12. The emitter 80 of the transistor T4 is coupled through a capacitor 86 to the output terminal 16 of applicant's circuit and is coupled through a resistor 88 to ground 14.

The above description of the drawing covered one mirror-image side of the differential amplifier shown there, as well as some supporting circuitry that is common to both sides. If the winding 24 of the magnetic head 20 were only grounded or coupled to some reference voltage, the mirror-image side already described would do fairly adequate service as a preamplifier; however, for improved preamplifier performance according to the inventive principle, a second mirror-image side hereinafter described is coupled to the winding 24. A transistor T5 having emitter 90, base 92, and collector 94 corresponds on the second mirror-image side to the transistor T1 above described. Accordingly, the base 92 is coupled through a capacitor 96 to the winding 24 and is coupled through a resistor 98 to the power supply junction 39, while the emitter 90 is coupled to the positive power supply 12 through two resistors 100 and 102. Parallel capacitors 104 and 106 decouple the resistors 100 and 102 to ground 14.

A transistor T6 having emitter 110, base 112, and collector 114 corresponds to the transistor T2 described above. Accordingly, its emitter 110 is directly coupled to the collector 94 of the transistor T5 and is also coupled by a resistor 116 to the negative power supply 10. The transistor T6, being in the grounded base configuration as was the transistor T2, its base 112 is coupled to ground 14 through the parallel combination of the capacitor 60, the capacitor 62, and the resistor 64. In like manner, the collector 114 is coupled to ground 14 through a resistor 118.

A transistor T7 having emitter 120, base 122, and collector 124 has its base 122 directly coupled to the collector 114 of the transistor T5. The transistor T7 corresponds in the second mirror-image to the transistor T3 described above; and its emitter 120 is directly coupled to the emitter 70 of the transistor T3. Also the base 72 of the transistor T3 and the base 122 of the transistor T7 are joined through a capacitor 126. Feedback from the collector 124 of the transistor T7 to the emitter 90 of the transistor T5 (similar to the feedback from the collector 74 of the transistor T3 to the emitter 30 of the transistor T1) is provided through a resistor 128. The second mirror-image of applicant's circuit differs from the first in that no circuit output (corresponding to that from the collector T5 of the transistor T3) is taken from the collector 124 of the transistor T7.

In the operation of the above-described preamplifier circuit, recorded signals on the magnetic tape 26 induce A.C. signal currents in the windings 22 and 24 of the head 20. These induced A.C. currents are coupled through the D.C. blocking capacitors 36 and 96 to the bases 32 and 92, respectively, of the transistors T1 and T5 in "push-pull" fashion, this is to say—the bases 32 and 92 are thereby fed signals of equal voltage but 180° out of phase. This halves the effect of winding capacitance of the head 20, thus permitting 1.4 as many turns in the windings 22 and 24 for a given bandwith. Moreover, a push-pull amplifier exhibits good noise rejection characteristics due to its differential or cancellation effect.

The amplifier signals on the collectors 34 and 94 of the transistors T1 and T5 are fed directly to the emitters 50 and 110 of the transistors T2 and T6, which are in grounded base configuration. The large resistor 64 maintains temperature stability in these transistors, and its relatively high noise product is decoupled by the parallel capacitors 60 and 62. The unique grounded emitter-grounded base configurations of the transistor pairs T1–T2 and T5–T6 has been found to avoid the Miller effect (collector-base capacitance) of the input transistors T1 and T5, because the low input impedance of T2 and T6 (characteristic of grounded base transistors) permits high power gain in T1 and T5 without the usual corresponding voltage gain.

Signals from the collectors 54 and 114 of the transistors T2 and T6 are coupled directly to the bases 72 and 122 of the transistors T3 and T7, which provide further amplification. The amplified signal appearing on the collector 74 of the transistor T3 is directly coupled to the base 82 of the emitter-follower transistor T4 which provides an impedance matching coupling with the output terminal 16 and circuitry to follow. The collectors 74 and 124 of the transistors T3 and T7 are coupled through the resistors 78 and 128, respectively, to the emitters 30 and 90, respectively, of the transistors T1 and T5 to provide feedback which adds to the input impedance of the first stage transistors T1 and T5 and at the same time tends to cancel distortion by being 180° out of phase. Use of very high resistances at 78 and 128 will provide a very "stiff" feedback loop; so that almost the entire signal on the collectors 74 and 124 will be returned to the emitters 30 and 90, resulting in almost total cancellation of the shunt effect of the emitter-base capacitance of the transistors T1 and T5. Thus applicant's circuit achieves a low input capacitance by the use of the feedback resistors 78 and 128 to cancel the effect of the emitter-base capacitance of the input transistors T1 and T5 and by the use of the grounded base transistors T2 and T6 to minimize voltage gain and the attendant Miller effect.

A preamplifier in accordance with the above description and drawing was built and operated using the following components:

| | |
|---|---|
| Voltages: | |
| **10** | v.D.C. −12 |
| **12** | v.D.C. +12 |
| Transistors: | |
| T1 | 014–505 |
| T2 | 014–506 |
| T3 | 014–506 |
| T4 | 014–506 |
| T5 | 014–505 |
| T6 | 014–506 |
| T7 | 014–506 |
| Resistors (ohms): | |
| **38** | 30K |
| **40** | 6.2 |
| **43** | 5.1K |
| **44** | 5.1 |
| **45** | 1.2K |
| **56** | 2.2K |
| **58** | 13K |
| **64** | 10K |
| **66** | 470 |
| **76** | 2K |
| **78** | 100 |
| **88** | 1K |
| **98** | 30K |
| **100** | 5.1 |
| **102** | 1.2K |
| **116** | 2.2K |
| **118** | 420 |
| **128** | 100 |
| Capacitors (microfarads): | |
| **36** | .22 |
| **42** | 2.2 |
| **46** | 2.2 |
| **47** | 33 |
| **60** | 2.2 |
| **62** | 4.7 |
| **86** | 2.2 |
| **96** | .22 |
| **104** | 2.2 |
| **106** | 33 |
| **126** | $15\times10^{-6}$ |

The above-specified circuit performed with less than 0.1% distortion over a 4 megacycle bandwith, while exhibiting input resistance of 25K ohms, input capacitance of 5.5 picofarads, and gain of 27 db from 50 kc. to 6 mc.

Thus applicant has achieved an improved preamplifier having a high input impedance and low input capacitance with greatly reduced amplifier noise contribution.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A preamplifier circuit for amplifying signals from a transducer comprising: an output terminal, a first transistor having emitter, base, and collector, the base of the first transistor being coupled to said transducer and being coupled to a first resistor, a second transistor coupled in grounded base configuration and having emitter, base, and collector, the emitter of the second transistor being directly coupled to the collector of the first transistor, a third transistor having emitter, base, and collector, the base of the third transistor being directly coupled to the collector of the second transistor, and the collector of the third transistor being coupled through a second resistor to the emitter of the first transistor and also being coupled to the output terminal, a fourth transistor having emitter, base, and collector, the base of the fourth transistor being coupled to said transducer and to a third resistor, a fifth transistor having emitter, base, and collector, the emitter of the fifth transistor being directly coupled to the collector of the fourth transistor and the base of the fifth transistor being coupled to the base of the second transistor, a sixth transistor having emitter, base, and collector, the emitter of the sixth transistor being coupled to the emitter of the third transistor, the base of the sixth transistor being coupled to the collector of the fifth transisor, and the collector of the sixth transistor being coupled through a fourth resistor to the emitter of the fourth transistor.

2. A preamplifier circuit for amplifying signals from a transducer comprising: an output terminal, a first transistor having emitter, base, and collector, the base of the first transistor being coupled through a first capacitor to said transducer and being coupled to a first resistor, a second transistor coupled in grounded base configuration and having emitter, base, and collector, the emitter of the second transistor being directly coupled to the collector of the first transistor, a third transistor having emitter, base, and collector, the base of the third transistor being directly coupled to the collector of the second transistor and the collector of the third transistor being coupled through a second resistor to the emitter of the first transistor, a fourth transistor arranged as an emitter follower and having emitter, base, and collector, the base of the fourth transistor being directly coupled to the collector of the third transistor and the emitter of the fourth transistor being coupled through a second capacitor to the output terminal, a fifth transistor arranged as an amplifier and having emitter, base, and collector, the base of the fifth transistor being coupled through a third capacitor to said transducer and to a third resistor, a sixth transistor having emitter, base, and collector, the emitter of the sixth transistor being directly coupled to the collector of the fifth transistor, the base of the sixth transistor being coupled to the base of the second transistor, a seventh transistor having emitter, base, and collector, the emitter of the seventh transistor being coupled to the emitter of the third transistor, the base of the seventh transistor being coupled to the collector of the sixth transistor, and the collector of the seventh transisor being coupled through a fourth resistor to the emitter of the fifth transistor.

3. A preamplifier circuit for amplifying signals from a transducer comprising: a positive power supply, a negative power supply, a ground terminal, an output terminal, a first transistor having emitter, base, and collector, the emitter of the first transistor being coupled through a first and a second resistor to the positive power supply, the base of the first transistor being coupled through a first capacitor to said transducer and being coupled through a third resistor to the positive power supply, second and third capacitors coupled in parallel from a point between the first and second resistors to ground, a second transistor having emitter, base, and collector, the emitter of the second transistor being directly coupled to the collector of the first transistor and being coupled through a fourth resistor to the negative power supply, the base of the second transistor being coupled through a fifth resistor to the negative power supply and through a sixth resistor to ground, and the collector of the second transistor being coupled through a seventh resistor to ground, the parallel combination of a fourth capacitor and a fifth capacitor coupled in parallel with the sixth resistor between the base of the second transistor and ground, a third transistor having emitter, base, and collector, the emitter of the third transistor being coupled through an eighth resistor to the negative power supply, the base of the third transistor being directly coupled to the collector of the second transistor, and the collector of the third transistor being coupled through a ninth resistor to the emitter of the first transistor, a fourth transistor having emitter, base, and collector, the collector of the fourth transistor being directly coupled to the positive power supply, the base of the fourth transistor being directly coupled to the collector of the third transistor, and the emitter of the fourth transistor being coupled through a sixth capacitor to the output terminal and through a tenth resistor to ground, a fifth transistor having emitter, base, and collector, the emitter of the fifth transistor being coupled through eleventh and twelfth resistors to the positive power supply, the base of the fifth transistor being coupled through a seventh capacitor to said transducer and through a thirteenth resistor to the positive power supply, the parallel combination of eighth and ninth capacitors coupled from a point between the eleventh and twelfth resistors to ground, a sixth transistor having emitter, base, and collector, the emitter of the sixth transistor being directly coupled to the collector of the fifth transistor and being coupled through a fourteenth resistor to the negative power supply, the base of the sixth transistor being coupled to the base of the second transistor, and the collector of the sixth transistor being coupled through a fifteenth resistor to ground, a seventh transistor having emitter, base, and collector, the emitter of the seventh transistor being coupled to the emitter of the third transistor, the base of the seventh transistor being coupled to the collector of the sixth transistor, and the collector of the seventh transistor being coupled through a sixteenth resistor to the emitter of the fifth transistor.

4. A preamplifier circuit for amplifying signals from a transducer comprising a first transistor having emitter, base, and collector, means coupling the base of said first transistor to said transducer, a second transistor coupled in grounded base configuration and having emitter, base, and collector, the emitter of the second transistor being directly coupled to the collector of the first transistor, a third transistor having emitter, base, and collector, the base of the third transistor being directly coupled to the collector of the second transistor, a feedback loop coupling the collector of the third transistor to the emitter of the first transistor, an output terminal coupled to the collector of the third transistor, and bias means coupled to the collector and base of said first transistor, the base of said second transistor, and the emitter of said third transistor to forward bias same.

References Cited by the Examiner

UNITED STATES PATENTS

| | | | |
|---|---|---|---|
| 2,835,748 | 5/1958 | Ensink et al. | 330—28 X |
| 2,889,416 | 6/1959 | Shea | 330—20 |
| 2,926,307 | 2/1960 | Ehret | 330—18 |
| 2,981,895 | 4/1961 | Koch | 330—20 X |
| 3,040,269 | 6/1962 | Hemphill et al. | 330—15 X |
| 3,200,343 | 8/1965 | Skinner | 330—20 X |

ROY LAKE, *Primary Examiner.*

F. D. PARIS, J. B. MULLINS, *Assistant Examiners.*